J. T. TUNIS.
Saws.
No. 152,437.
Patented June 23, 1874.
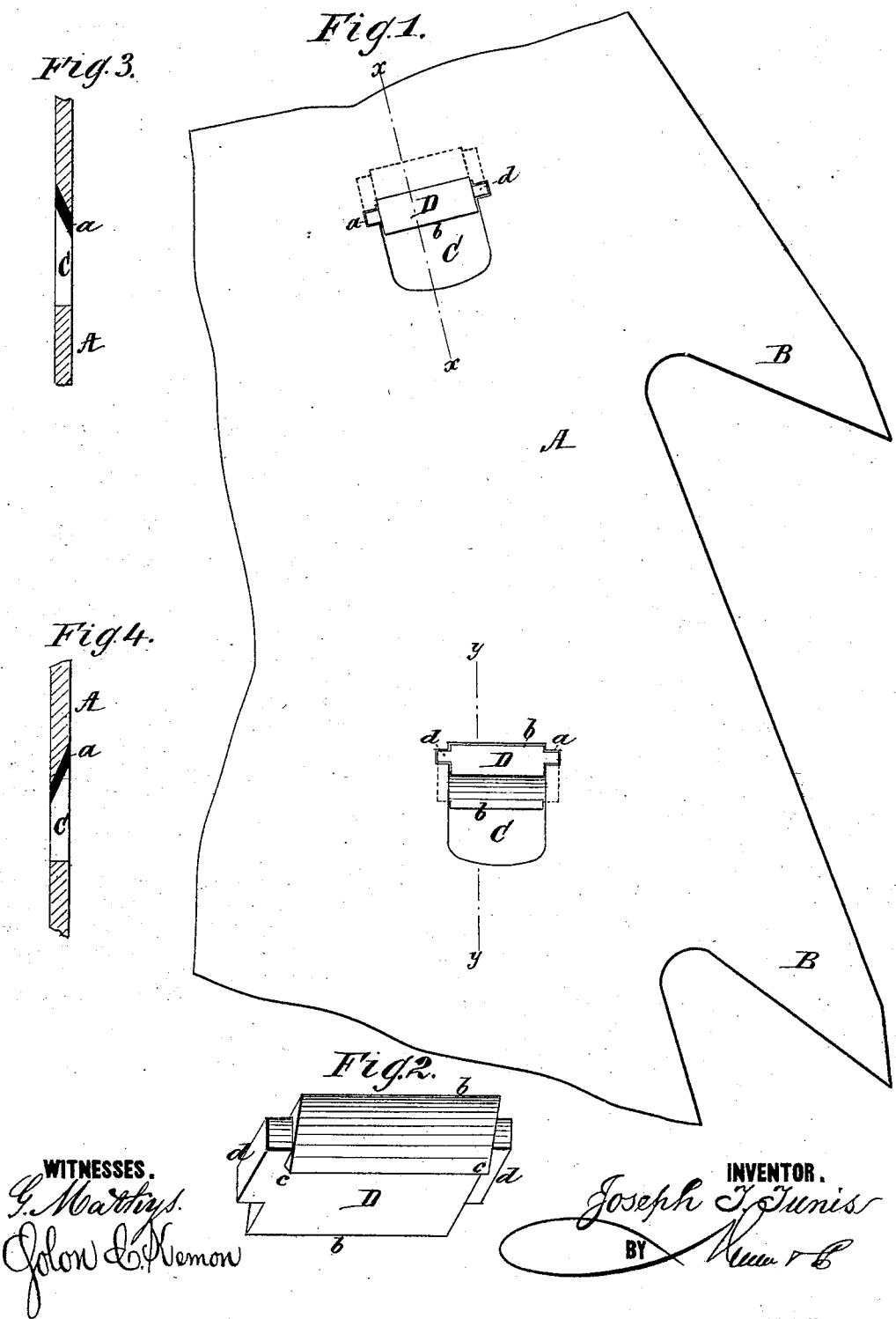

UNITED STATES PATENT OFFICE.

JOSEPH T. TUNIS, OF ST. MICHAEL'S, MARYLAND.

IMPROVEMENT IN SAWS.

Specification forming part of Letters Patent No. 152,437, dated June 23, 1874; application filed May 16, 1874.

*To all whom it may concern:*

Be it known that I, JOSEPH T. TUNIS, of St. Michael's, in the county of Talbot and in the State of Maryland, have invented a new and useful Improvement in Saws; and I do hereby declare the following to be a full, clear, and exact description of the same, reference being had to the accompanying drawing forming a part of this specification, in which—

Figure 1 is a side elevation of a fragment of a saw, showing my invention applied to it. Fig. 2 is a view in perspective of one of the planing-knives. Fig. 3 is a section in line $x$ $x$, Fig. 1. Fig. 4 is a section in line $y$ $y$ of same figure.

The invention relates to that class of improvements upon circular saws which are intended to plane down the kerf upon the sawed material during the operation of sawing; and consists in a new and improved method of doing the same by inserting, in holes near the circumference of the saw, double-edged planing-knives, having symmetrical sides, and projecting alternately on opposite sides of the saw just far enough to remove the kerf without wasting the plank, as hereinafter set forth and claimed.

In the drawing, A represents a section of a circular saw, having the teeth B. C are the holes near the circumference, having grooves $a$, into which the planing-knives fit and are held, said grooves being diagonal to the plane of the saw, and so placed as to cause the projecting knives to alternate on opposite sides of the saw. D D are the detachable planing-knives, having symmetrical edges $b$, ledges $c$, and ends $d$ that fit into the grooves $a$. Said knives are made detachable and with symmetrical sides in order that they may be taken out when dull or blunted, and replaced with the sharp edge out.

The said planing-knives operate in combination with the saw in the following manner: The knives are first adjusted in the grooves to suit the thickness of the kerf, and then, as the saw revolves, the operation of cutting by the saw-teeth is immediately followed by that of planing by the knives, the holes C serving to ventilate the saw and keep it cool, and also to form, with the teeth D, throats for the escape of the trimmings.

Having thus described my invention, what I claim is—

The detachable double-edged planing-teeth D, having the symmetrical edges $b$, ledges $c$, and ends $d$, in combination with the saw-plate A, having diagonal grooves $a$, alternating in direction, as and for the purpose specified.

JOSEPH T. TUNIS.

Witnesses:
 SOLON C. KEMON,
 CHAS. A. PETTIT.